United States Patent [19]
Abe

[11] Patent Number: 4,833,532
[45] Date of Patent: May 23, 1989

[54] IMAGE PROCESSOR FOR MAKING A COLOR REPRODUCTION FROM A COLOR NEGATIVE FILM INCLUDING MEANS FOR GENERATING A SIGNAL INDICATIVE OF THE TYPE OF COLOR NEGATIVE FILM AND MEANS FOR REMOVING AN ORANGE MASK COMPONENT OF THE FILM

[75] Inventor: Shunichi Abe, Kawasaki, Japan

[73] Assignee: Canon Kabushiki Kaisha, Tokyo, Japan

[21] Appl. No.: 57,657

[22] Filed: Jun. 8, 1987

Related U.S. Application Data

[63] Continuation of Ser. No. 615,590, May 31, 1984, abandoned.

[30] Foreign Application Priority Data

Jun. 6, 1983 [JP] Japan .................................. 58-99461

[51] Int. Cl.$^4$ .......................... G03F 3/08; H04N 1/46; H04N 9/69
[52] U.S. Cl. ...................................... 358/80; 358/32; 358/75
[58] Field of Search ........................ 358/75, 76, 78, 80, 358/75 IJ, 280, 284, 32, 54, 164

[56] References Cited

U.S. PATENT DOCUMENTS

| | | | |
|---|---|---|---|
| 3,610,815 | 10/1971 | Gould et al. | 358/21 R |
| 4,032,969 | 6/1977 | Ueda | 358/80 |
| 4,097,892 | 6/1978 | Balding | 358/80 |
| 4,271,436 | 6/1981 | Kurose et al. | 358/284 |
| 4,305,094 | 12/1981 | Yamada | 358/80 |
| 4,335,399 | 6/1982 | Matsumoto | 358/80 |
| 4,346,402 | 8/1982 | Pugsley | 358/80 |
| 4,364,084 | 12/1982 | Akimoto et al. | 358/76 |
| 4,394,688 | 7/1983 | Iida et al. | 358/163 |
| 4,402,015 | 8/1983 | Yamada | 358/280 |
| 4,410,909 | 10/1983 | Ueda et al. | 358/80 |
| 4,448,521 | 5/1984 | Shiota | 355/38 |
| 4,472,736 | 9/1984 | Ushio et al. | 358/80 |
| 4,491,864 | 1/1985 | Yamada | 358/80 |
| 4,517,590 | 5/1985 | Nagashima et al. | 358/75 |
| 4,558,356 | 12/1985 | Toda et al. | 358/80 |
| 4,561,016 | 12/1985 | Jung et al. | 358/76 |
| 4,679,073 | 7/1987 | Hayashi | 358/75 |
| 4,679,074 | 7/1987 | Sugiura et al. | 358/80 |
| 4,700,236 | 10/1987 | Abe | 358/280 |
| 4,745,466 | 5/1988 | Yoshida et al. | 358/80 |
| 4,752,822 | 6/1988 | Kawamura | 358/80 |

FOREIGN PATENT DOCUMENTS

| | | | |
|---|---|---|---|
| 2803866 | 8/1978 | Fed. Rep. of Germany . | |
| 55-39418 | 3/1980 | Japan | 358/29 C |
| 56-87044 | 7/1981 | Japan . | |
| 58-150375 | 9/1983 | Japan | 358/50 |
| 58-150376 | 9/1983 | Japan | 358/50 |
| 2032633 | 5/1980 | United Kingdom . | |

OTHER PUBLICATIONS

Karel Staes, "The Role of Film in the Film-Plus-Telecine System: Considerations About Telecine Design", SMPTE Journal, vol. 87, Sep. 1978, pp. 565-573.

Primary Examiner—James J. Groody
Assistant Examiner—Randall S. Svihla
Attorney, Agent, or Firm—Fitzpatrick, Cella, Harper & Scinto

[57] ABSTRACT

A color image processing apparatus including a read-out device for reading a color negative film to produce three color component signals, one component for each of three formation colors. A generation device generates a signal indicating the type or condition of the color negative film read by the read-out device. A gamma correction mechanism corrects the gamma characteristics of the three color component signals and removes an orange mask component corresponding to the indication signal generated by the generating device from the three color component signals. A color masking processing system derives a recording color signal for each formation color from the three color component signals from which the orange mask component has been removed. A color image forming device sequentially forms a color image for each color from each of the recording signals. Also provided is a control mechanism for enabling the read-out device, the gamma correction device, and the color masking processing system a predetermined number of times corresponding to the number of formation colors.

11 Claims, 9 Drawing Sheets

COLOR COPIER FOR MAKING A POSITIVE COLOR COPY FROM A COLOR NEGATIVE FILM INCLUDING MEANS FOR INDICATING THE TYPE OF FILM AND MEANS FOR REMOVING THE ORANGE MASK COMPONENT OF THE INDICATED FILM FROM THREE COLOR COMPONENT SIGNALS USED TO MAKE THE COPY

This application is a continuation of application Ser. No. 615,590 filed May 31, 1984, now abandoned.

BACKGROUND OF THE INVENTION

1. Field of the Invention

The present invention relates to a device for processing color images, and in particular, to an image processor for making possible a proper image reproduction from an object to be reproduced.

2. Description of the Prior Art

With prior art color copying machines, copying from a positive film is easy, but copying from a negative film is very difficult. When copying must be made from a negative fllm, the purpose may be attained by color correction from the portion of blue (B) in the negative film to yellow (Y), the portion of green (G) to magenta (M), and the portion of red (R) to cyan (C) for copying. Since, a general negative film masking is applied by type, the required color correction is very difficult.

SUMMARY OF THE INVENTION

The present invention has been mdde to give a solution to the above problem.

An object of the present invention is to provide an image processor which makes possible a proper color image reproduction.

Another object of the present invention is to provide an image processor of simple structure which makes possible optimum color image reproduction.

A further object of the present invention is to provide an image processor which makes possible a high picture quality color image reproduction with the same gradation regardless of the type of the object to be reproduced.

A further object of the present invention is to provide an image processor capable of optimum reproduction of a negative film.

Another object of the present invention is to provide an image processor which selects a color correction circuit according to the type of a negative film.

Still another object of the present invention is to provide an image processor which selects a gamma conversion characteristic according to the type of a negative film.

A further object of the present invention is to provide an image processor which selects a gamma conversion characteristic by key input.

The above and the other objects of the present invention will now be described in detail.

DETAILED DESCRIPTION OF PREFERRED EMBODIMENTS

An embodiment of the present invention will now be described with reference to drawings.

Figure 1:
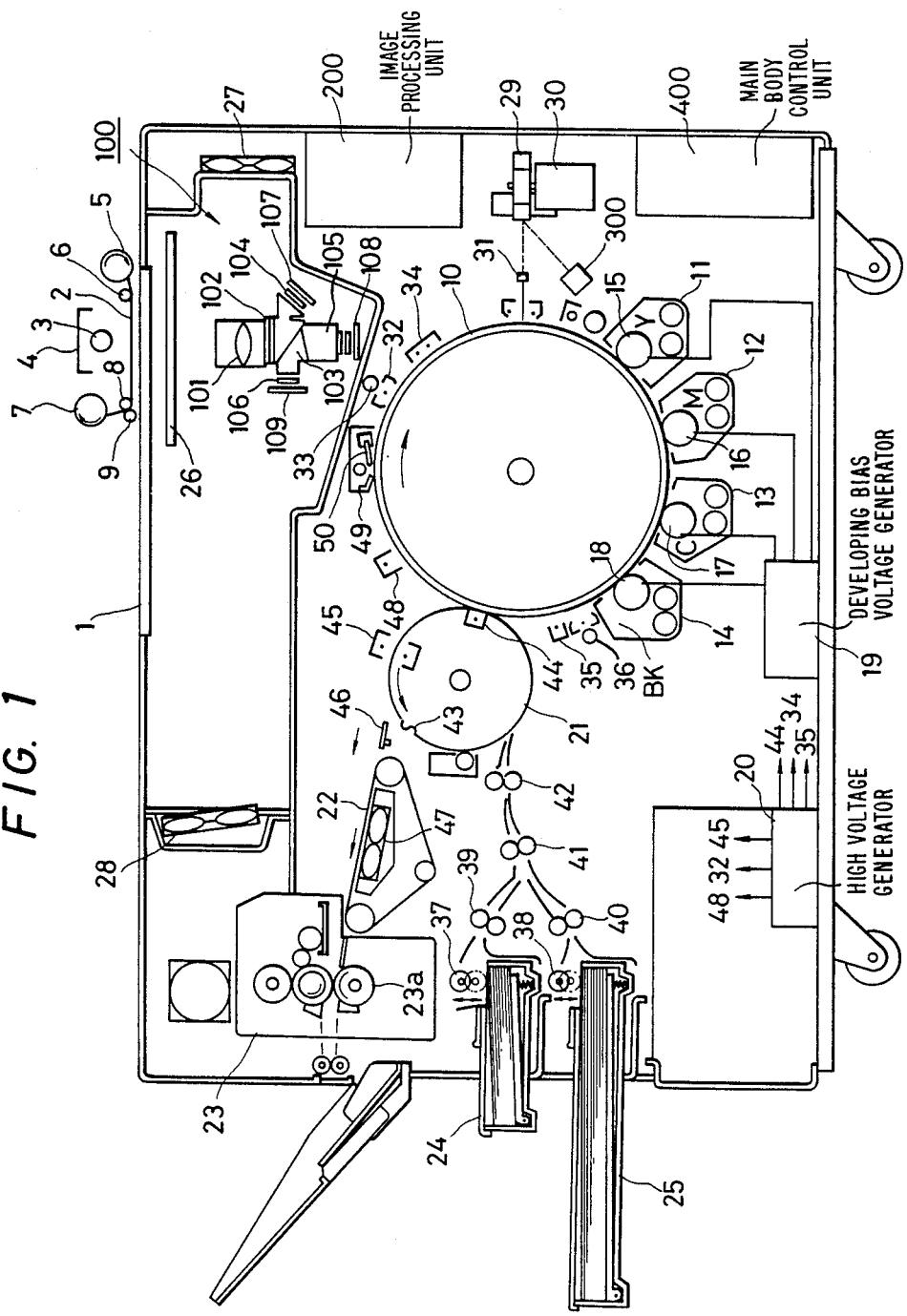
FIG. 1 is a schematic layout diagram of the color copying machine of the present invention.

FIG. 1 is a schematic layout drawing of the color copying machine of the present invention wherein 1 is an original platen made of a transparent glass plate; 2 is a negative film as an object to be copied; 3 is an illumination lamp for lighting the negative film 2; 4 is its reflection shade; 5 is a drive reel of the negative film 2; 6 is a guide roller; 7 is a take-up reel; and 8 and 9 are a pinch roller and a capstan, respectively. Reference numeral 10 is a photosensitive drum; 11 through 14 are developers for individual reference colors disposed on the circumference of the photosensitive drum 10; 15 through 18 are developing sleeves for the individual developers; 19 is a developing bias voltage generator for supplying a bias voltage to the individual developing sleeves 15 through 18; 20 is a high voltage generator for charging and discharging the photosensitive drum 10; 21 is a transfer drum; 22 is a conveyer belt for conveying the copy paper on which a toner image was transferred at the transfer drum 21 to a fixing unit 23; and 24 and 25 are an upper and a lower cassette for accommodating the copy paper, either of which is selected by the selection switch (not shown) provided in the main operation panel. 27 and 28 are fans for cooling the interior; 100 is a CCD photosensor unit for forming an image on a solid pick-up element (CCD) upon the reception of a light from the illumination lamp 3 coming through the negative film 2; 200 is an image processing unit for image processing the output from the CCD photosensor unit 100; 300 is a laser modulation unit performing the exposure of the photosensitive drum 10, and 400 is a main body control unit for controlling the entire copying machine main body.

Now, the function to be performed by the embodiment ofthe above structure will be described.

The negative fimm 2 is placed on the original platen 1, and moves at a speed equal to 1/8.75 of the linear speed of the photosensitive drum 10 by means of the pinch roller 8 and the capstan 9, while being exposed to a direct ray from the illuminating lamp 3 and a reflected light from the reflection shade 4. This moving speed is equal to one relative to the linear speed of the drum 10 when copying is made to an A4 size copy paper. Since the size of the A4 copy paper is 210 mm×297 mm as compared to 24 mm×36 mm of the negative film 2, the image is copied magnified to 8.75 times larger. The light from the illumination lamp 3 enters the CCD photosensor unit 100 after passing through the negative film 2, passes through an infrared cut filter 102 via a lens 101, and is divided to a blue (B) light, a green (G) light, and a red (R) light having different wavelengths being directed by a color separating prism 103. The blue, green, and red lights thus divided form images on solid pick-up elements (CCD) 107 through 109, respectively after being subjected to intensity adjustment and spectral characteristics correction at a B filter 104, a G filter 105 and an R filter 106, respectively. The outputs from these solid pickup elements 107 through 109 are converted to digital signals by the image processing unit 200, required image processing is performed there, and a laser beam modulated by a video signal is radiated from the laser modulation unit 300 to a polygonal mirror 29. Since the polygonal mirror 29 is rotated at a fixed speed by a scanner motor 30, the laser beam scans over the photosensitive drum 10 orthogonal to the rotation of the photosensitive drum 10. A photosensor 31 is prvvided before the photosensitive drum 10 located on the path of the laser beam, and a laser horizontal sync signal BD is generated as the laser beam passes.

On the other hand, after being discharged uniformly by a discharge electrode 32 supplied by a high voltage power from the high voltage generator 20 and a discharge lamp 33, the photosensitive drum 10 is charged (about −700 V) by a negative charger 34 connected to the high voltage generator 20 uniformly. When the laser beam modulated by the video signal is radiated onto the photosensitive drum 10 negative-charged uniformly, the electric charge in the portion of the surface of the photosensitive drum 10 exposed to the laser beam flows to a main bod ground by the photoconductive phenomenon and disappears. Accordingly, when the laser is lit for the light (white) portion of the negative film 2, and the laser is not lit for the dark (black) portion of the negative film 2, the potential at the surface becomes −50 V to −100 V at the portion corresponding to the light portion of the negative film 2, and the portion corresponding to the dark portion of the negative film 2 remains at a potential about −700 V, and a static latent image is formed on the photosensitive drum 10 corresponding to the shading of the negative film 2. This static latent image is developed by the developers of individual reference colors selected by a control signal from the main body control unit 400, namely the yellow (Y) developer 11, magenta (M) developer 12, cyan (C) developer 13, and black (BK) developer 14, and a toner image is formed on the surface of the photosensitive drum 10. Prior to that, the developers 11 through 14 apply about −400 V bias voltage by the developing bias generator 19 so that the developing sleeves 15 through 18 become negative potential. The toner in the developers 11 through 14 has been agitated, and has been negative-charged by the frictional charging. This toner adheres to the portion of the surface potential of the photosensitive drum 10 at −50 to −100 V, i.e., the portion corresponding to the light portion of the negative film 2. The toner image thus formed on the photosensitive drum 10 is transferred to the transfer drum 21, and then the surface potential of the high voltage generator 20 is made uniform with any unnecessary electric charge being discharged by a post electrode 35 negative-charged by the high voltage generator 20 and a discharging small lamp.

Either of the copy papers encased in the upper and lower cassette 24 and 25 is selected by the selection switch provided in the main operation panel 26, and carried by a sheet feed roller 37 or 38. The paper runs through a delivery roller 39 or 40, skew is corrected by a first register roller 41, and the paper is carried at the timing taken by a second register roller 42. The front end of the delivered copy paper is clutched by a gripper 43 of the transfer drum 21, and the copy paper is wound electrostatically about the transfer drum 21. Reference numeral 44 represents a transfer charger. The toner image formed on the photosensitive drum 10 is transferred to the copy paper wound about the transfer drum 21 in a position contacting with the transfer drum 21. The transfer of this toner image to the copy paper is performed as many times as specified according to the preset copy color mode. When toner image of every color is transferred to the copy paper, the copy paper is discharged by a discharge electrode 45 having a high voltage which was applied from the high voltage generator 20. Then the copy paper is peeled off from the transfer drum 21 by a stripping device 46, drawn onto the conveying belt 22 by aconveying fan 47, and directed to the fixing unit 23. Copying now ends. On the other hand, the residual electric charge in the photosensitive drum 10 is discharged by the cleaner pre-discharge electrode 48 connected with the high voltage generator 20; and then the residual toner on the photosensitive drum 10 is removed by a cleaning blade 50 of a cleaner unit 49; and then the electric charge on the photosensitive drum 10 is removed by the discharge electrode 32 and the discharge lamp 33 connected with the high voltage generator.

Now, the main body operation sequence when the copy color mode is 4-color (Y, M, C and BK) full color mode will be described supplementarily.

A light from the illumination lamp 3 which has scanned the negative film 2 is sensed by the CCD photosensor unit 100, the image of three colors (B, G and R) are read by the respective solid pickup elements 107, 108 and 109, the image processing unit 200 calculates the amounts of Y, M, C which are complementary colors of B, G and R, and BK which is black ink color and processing such as color correction is performed. The scan of the negative film 2 is performed 4 times. In the first scan, a signal of the Y component calculated by the image processing unit 200 is radiated to the photosensitive drum 10 by the laser beam which has been laser-modulated at the laser modulation unit 300, and a latent image is formed on the photosensitive drum 10. This latent image is developed at the yellow developer 11, and the yellow toner is caused to stick. This yellow toner image is transferred to the transfer paper (copy paper) wound about the transfer drum 21. At the same time, the magenta toner image is transferred to the transfer paper based on the second scan, the cyan toner image is transferred to the transfer paper based on the third scan, the black toner image is transferred to the transfer paper based on the fourth scan, each toner is fixed at the fixing unit 23, and copying (printing) in a full 4-color mode is completed.

Figure 2:
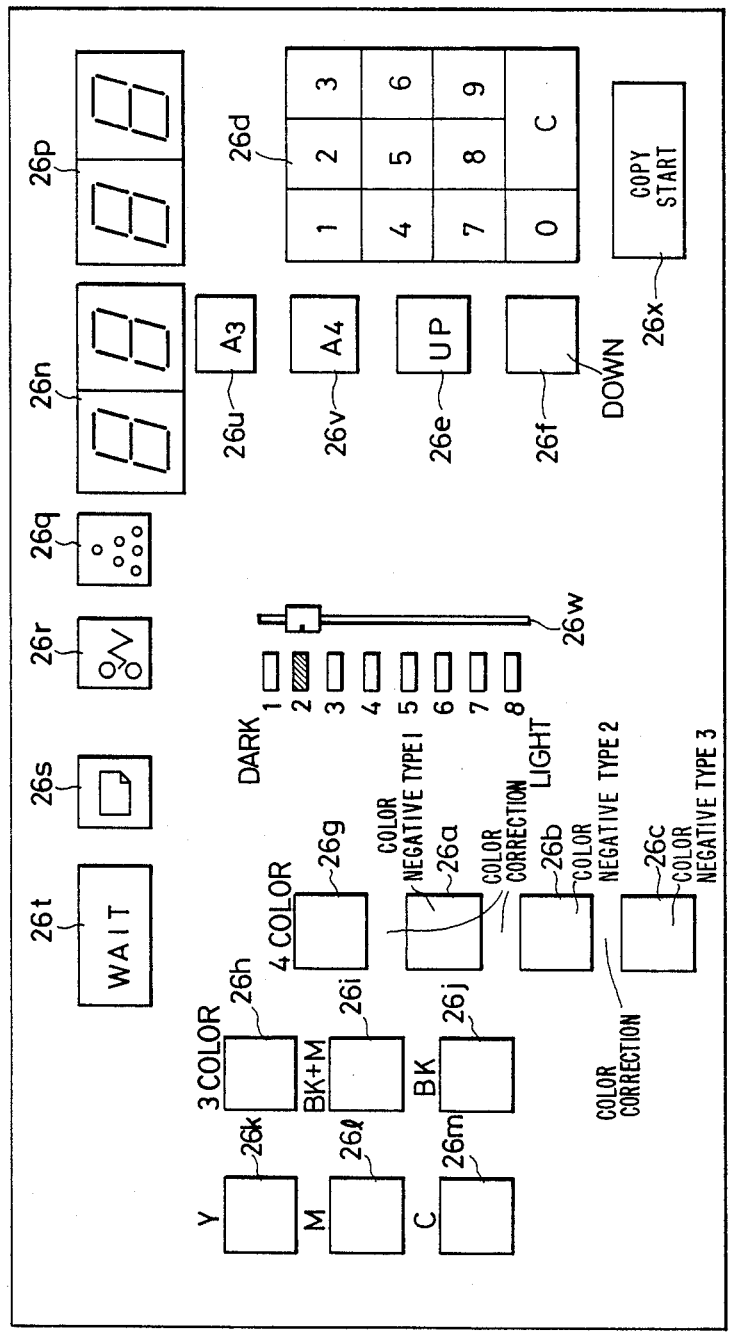
FIG. 2 is a drawing showing operation parts and display parts of the main operation panel.

FIG. 2 shows the operation parts and display parts of the main operation panel 26. In the FIGS., 26a, 26b and 26c are pushbutton switches for switching the color correction circuit (described later) according to the type of the negative film as color correction circuit selection mechanisms. Those are provided according to the type of the negative film, and designed to be capable of selecting a circuit of optimum contrast (hereinafter referred to as gamma). 26d is a numerical value input keypad provided for setting the number of copies, 26e and 26f are cassette selection keys for selecting either the upper cassette 24 or the lower cassette 25 shown in FIG. 1, and 26g, 26h, 26i, 26j, 26k, 26l and 26m are color mode selection keys for selecting color copy mode. For example, the 4 COLOR mode to be selected by the selection key 26g performs the original exposure scan 4 times, for each scan the development is made by the toner of Y, M and C corresponding to the exposed image (latent image) of the original color-separated to B, G and R. In the fourth scan, development is made corresponding to the BK component of the original, development is made by the BK toner corresponding to the BK component of the original, and a cppy of full color image is obtained by superimposing color images of four colors. Similarly, in the three COLOR mode to be selected by the selection key 26h, a copy of the image developed by the toners of Y, M and C based on each of three original exposure scans is obtained, in the BK+M mode, a copy of the image developed by the toners of BK and M can be obtained based on twice original exposure scans, and in each of the BK, Y, M and C modes a copy of the image developed by the monochrome toner can be obtained based on a single original exposure scan. A 7-segment LED, 26n, for displaying copy sheet set quantity; 26p is a 7-segment LED for copy sheet count display, 26q is an indicator which lights when the supply toner in the toner hopper (not shown) is detected to have been spent by the detector; 26r is an indicator which lights when jam is detected by a jam detector provided in the delivery path of the copy paper; 26s is an indicator which lights when the copy paper in the selected cassette 24 or 25 is detected as being exhausted; and 26t is an indicator which lights when the surface temperature of a thermal pressure fixing roller 23a of the fixing unit is not at a specified level. When even one of these indicators 26q, 26r, 26s and 26t is on, the copying operation is not performed. 26u and 26v are paper size indicators designed to indicate the copy paper size in the selected cassette 24 or 25. 26w is a copy shade level adjusting lever, and 26x is a copy start switch.

Figure 3:
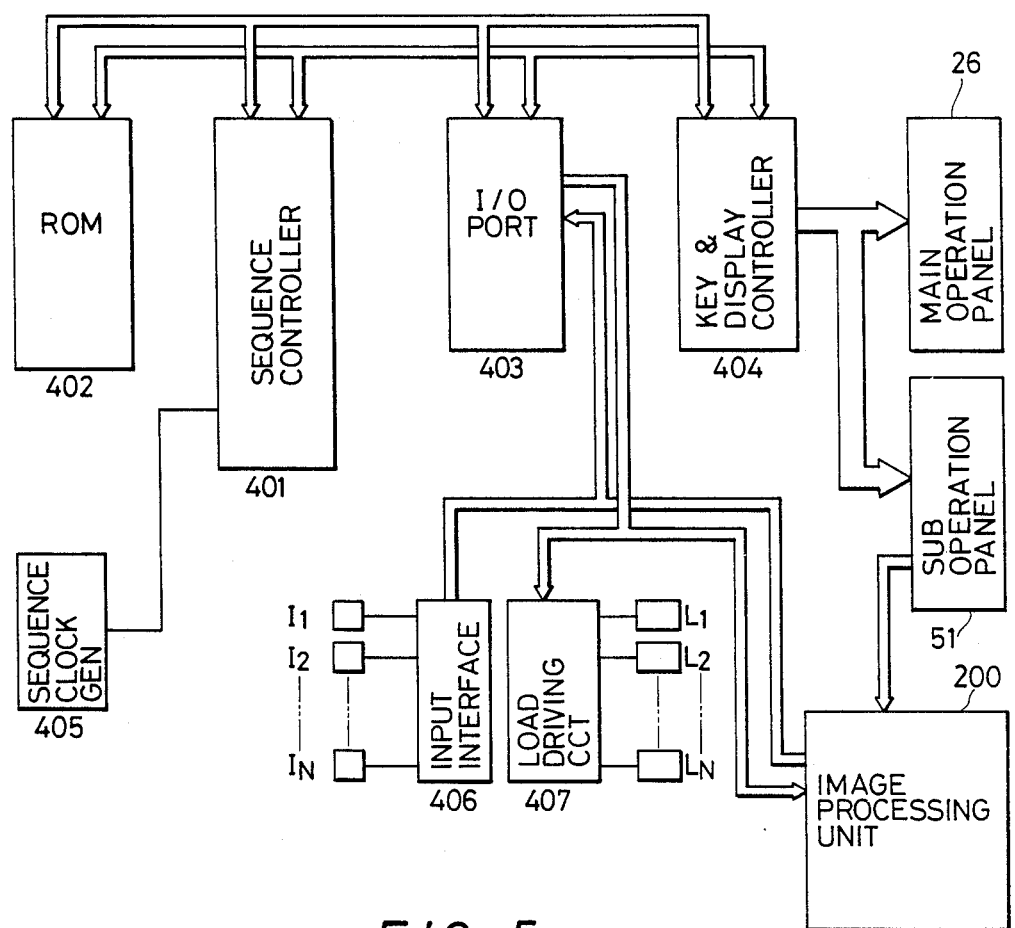
FIG. 3 is a control block diagram of the main body control unit.

In FIG. 3, 51 is a sub operation panel comprising the operation unit the operator uses for the machine operation together with the main operation panel 26; 401 is a sequence controller for controlling all loads including a drive motor (not shown) of the photosensitive drum 10, the illumination lamp 3, and so forth; 402 is a memory unit (ROM) for storing the sequence controller table; 403 is an I/0 unit (I/0 port); 404 is a controller for controlling keys and displays of the main operation panel 26; 405 is a sequence clock generator; 406 is an input interface for inputting signals from detectors I1, I2, . . . In for lighting indicators shown in FIG. 2; and 407 is a load driving circuit for driving loads L1, L2, . . . Ln such as the illumination lamp 3.

Figure 5:
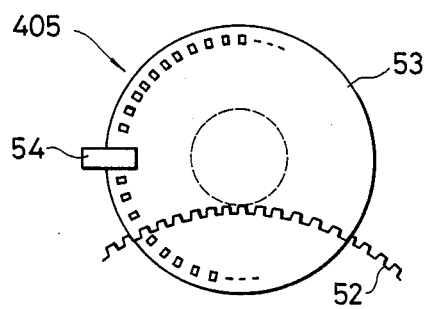
FIG. 5 shows the structure of the sequence clock generator.
Figure 4:
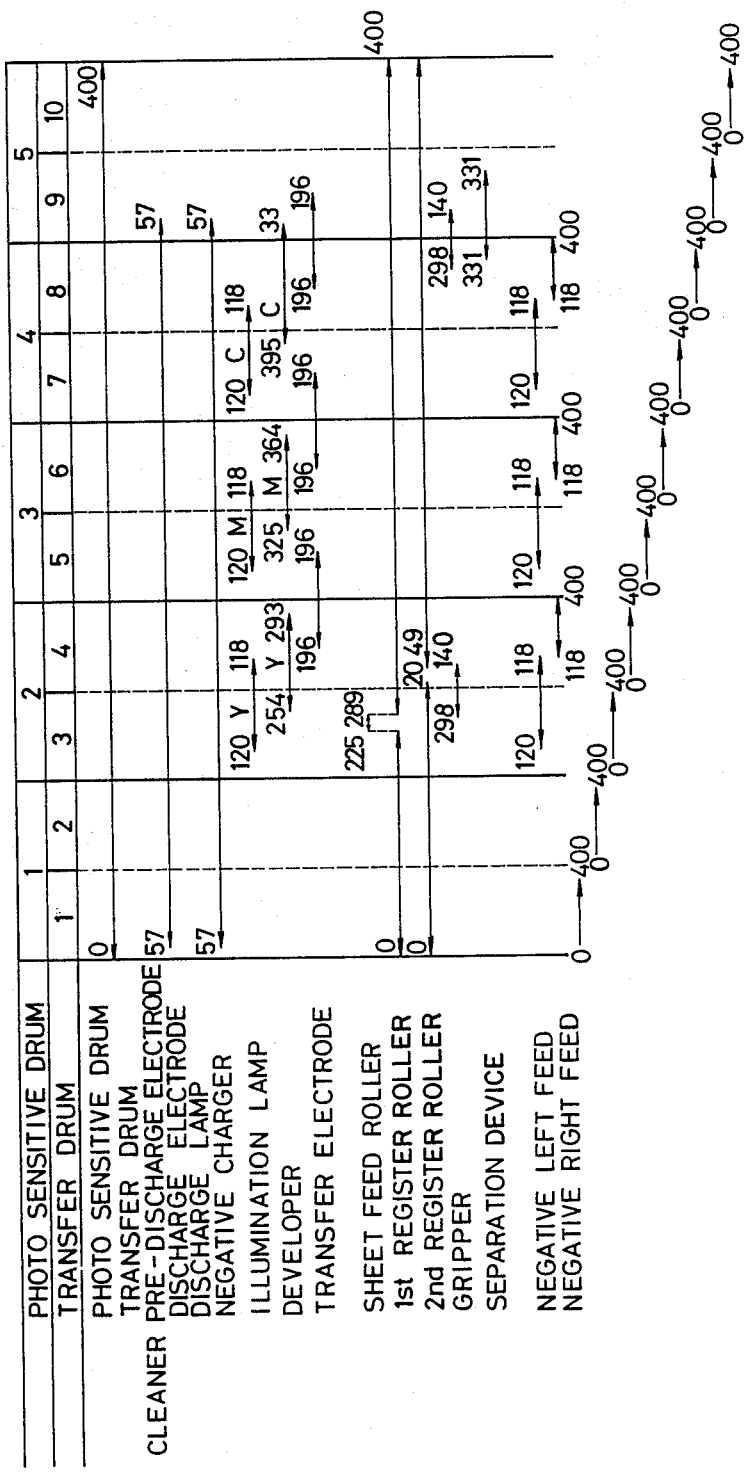
FIG. 4 is a timing chart of the control sequence in FIG. 3.

Loads to be driven by the main operation panel 26 and the sub operation panel 51 which are the operation unit include keys, lamps, LEDs, and the like, and are controlled by the controller 404. The timing chart of FIG. 4 shows, as an example, the sequence for obtaining a color image of Y, M and C by superimposing. For obtaining the full color image of Y, M and C, the photosensitive drum 10 and the transfer drum 21 must be given 5 and 10 turns, respectively. Accordingly, the ratio of the drum diameter of the photosensitive drum 10 to that of the transfer drum 21 becomes 2: 1. This sequence proceeds according to a drum clock C generated according to the rotation of the photosensitive drum 10 by the sequence clock generator 405 comprised of a clock panel 53 to be driven by a gear 52 ooupled with the drive shaft of the photosensitive drum 10 and a photointerrupter 54 as shown in FIG. 5 based on the rotation of the photosensitive drum 10 and the transfer drum 21, and as the transfer drum 21 makes a turn, 400 clock signals of the drum clock C are counted. The drum clocks which are generated at a reference point of the transfer drum are counted as photoconductor drum 10 rotates. The count of the drum clocks is used to control the drive start and stop for various loads, such as the resist-roller and the laser. Figures shown in the operation timing and non-operation timing in the timing chart of FIG. 4 are clock count values when the HP is taken as clock count 0. For example, the illumination lamp 3 it so controlled that it goes on at clock 120 count of the third turn of the transfer drum 21, at 120 count of the fifth turn, and at 120 count of the seventh turn, and it is turned off at 118 count of the fourth turn, 118 count of the sixth tturn, and 118 count of the eighth turn.

Now, the copying operation will be described in detail with reference to the timing chart of FIG. 4.

When the copy start switch 26x of the main operation panel is operated, and its ON signal is detected by the controller 404 of the main body control unit 400, the sequence controller 401 starts sequence operation, thereby driving the photosensitive drum 10, the transfer drum 21, the first register roller 41, and the second register roller 42. The negative film is placed on the original platen 1, and moves on the original platen at a constant speed from the clock 120 count at the third turn of the transfer drum 21 at which the illumination lamp 3 lights, while being radiated by the illumination lamp 3. The transmitting light from the negative film by the exposure scan reaches the color separating prism 103 via the lens 101 of the CCD photosensor unit 100, and is subjected to color separation here to become three colors of B, G and R. The transmitting light mage from the negative film thus separated forms an image on the solid pickup elements 107 through 109 after passing through the filters 104 through 106. The color separated light image correspondnng to the negative film photosensed at the solid pickup elements (CCD) 107 through 109 is subjected to photoelectric conversion (digital signal conversion) at the image processing unit 200, further processed to required realtime data (image data). Then, in the sequence of B, G and R, the photosensitive drum 10 is exposed to the laser beam modulated by the above image data, and a latent image corresponding to the negative film 2 is formed on the surface of the photosensitive drum 10. The negative film 2 is rewound by the take-up reel 7 between the first exposure scan and the second exposure scan, and between the second exposure scan and the third exposure scan of the above negative film 2.

As shown in the timing chart of FIG. 4, the latent image on the photosensitive drum 10 formed according to the first exposure scan is developed by the Y developer 11 which starts operation at clock 254 count of the third turn of the transfer drum 21 and stops operation at clock 293 count of the fourth turn of the transfer drum 21. The image, thus developed, is transferred to the copy paper wound about the transfer drum 21 by the transfer electrode 44 which starts operation at clock 196 count of the fourth turn of the transfer drum 21 and stops at clock 196 count of the fifth turn of the transfer drum 21, as a yellow toner image corresponding to the yellow component of the negative film 2. In the same fashion, at the fifth, sixth and seventh turns of the transfer drum 21, and at the seventh, eighth and ninth turns of the transfer drum 21, a magenta toner image corresponding to the magenta component of the negative film 2 and a cyan toner image corresponding to the cyan component of the negative film 2 are multiple-transferred onto the same copy paper. The transmission light image from the negative film 2 is separated to three color components of B, G and R at the color separating prism 103, and forms images on the CCDS 107, 108 and 109, respectively. At the time of image read for forming a yellow toner image, G and R signals are used for the color correction, at the time of image read for forming a magenta toner image B and R signals are used for the color correction, at the time of image read for forming a cyan toner image B and G signals are used for the color correction, and processing is made in the sequence of Y, M and C.

On the other hand, at clock 225 count of the third turn of the transfer drum 21 at which time the first exposure scan is performed, for feeding a copy paper from the cassette selected by the main operation panel, the sheet feed roller 37 is actuated in the case of the upper cassette 24, and the sheet feed roller 38 in the case of the lower cassette. The copy paper thus fed is wound about the transfer drum 21 through the delivery roller, the first register roller 41, and the second register roller 42, and individual toner images are multiple-transferred. When the transfer is completed, the copy paper is peeled off from the transfer drum 21 by means of the seaaration nail 46 and is directed to the fixing unit 23 by the conveyer belt 22. Thermal pressure fixing of the toner is performed, and copying the negative film 2 ends.

From the sequence controller 401 of the main body control unit 400 to the image processing unit 200, a yellow exposure signal is sent out before th start of the exposure scan for the first yellow toner image forming, a magenta exposure signal before the exposure scan start-up oor the second magenta toner image forming, a cyan exposure signal before the exposure scan start-up for the third cyan toner image forming, and a black exposure signal before the exposure scan start-up for the fourth black toner image forming.

Figure 6:
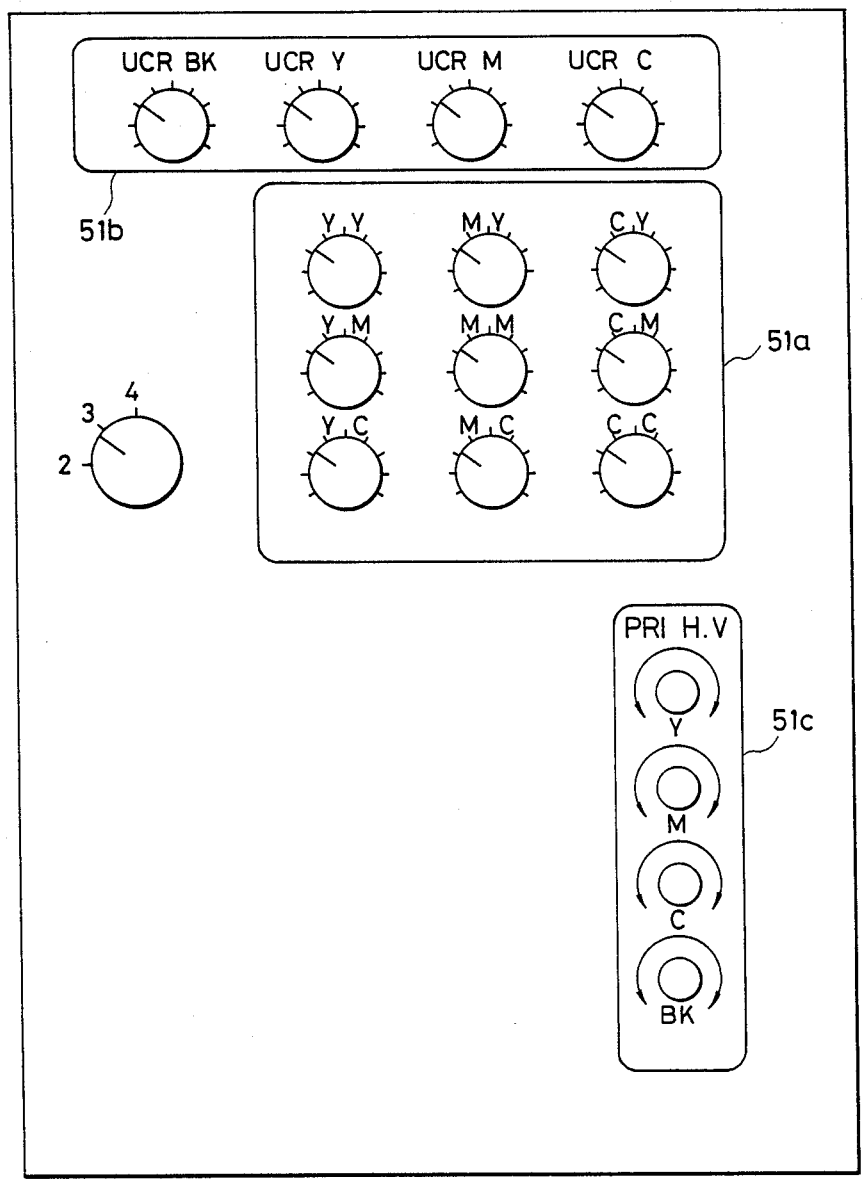
FIG. 6 illustrates the sub operation panel.

Now, the sub operation panel will be described with reference to FIG. 6.

Numeral 51a is a switch group for the masking process applied on the negative film 2, and the switches are rotary digital code switches for determining coefficients ai, bi and ci (i=1 2, 3) when applying the following data conversion to the yellow picture element Yi to be fed to a masking processing circuit (mentioned later), the magenta picture element Mi, and the cyan picture element data Ci, and for generating digital codes from 0 to 16. The data conversion for the masking process can be given by the folowing expressions.

$$Y_0 = a_1 Y_i - b_1 M_i - c_1 C_i \quad (a)$$

$$M_0 = a_2 Y_i + b_2 M_i - c_2 C_i \quad (b)$$

$$C_0 = -a_3 Y_i - b_3 M_i + c_3 C_i \quad (c)$$

51b is a switch group for correcting Y, M, C, BK data in the later mentioned UCR processing circuit, and consists of rotary digital switches for setting correction coefficients. 51c is a control section for adjusting outputs from the high voltage generator 20. For example, it controls a current flowing to the negative charger 34 for negative-charging the photosensitive drum 10, thereby adjusting the shading of each color of the image, and changing color balance.

Figure 7:
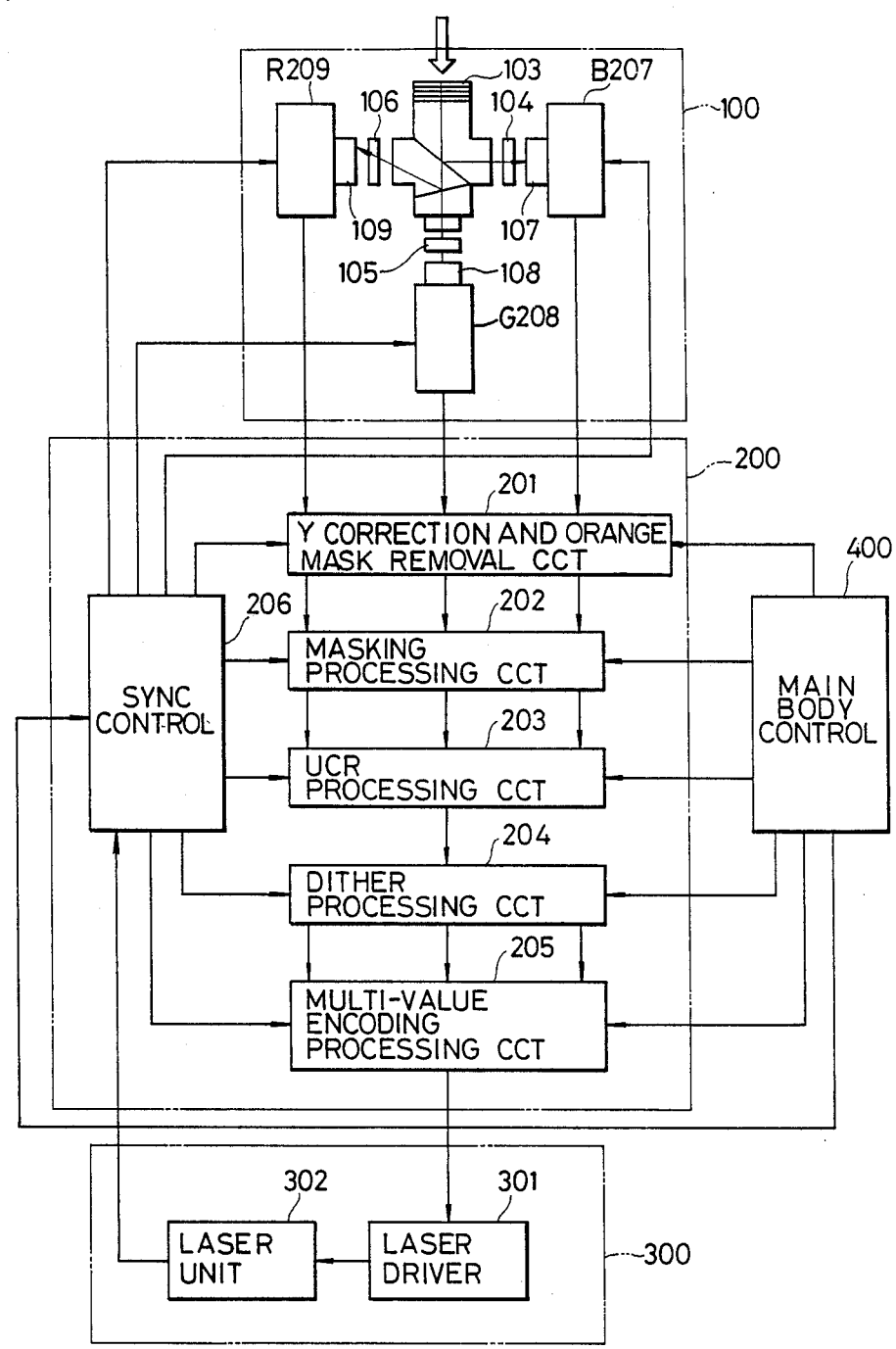
FIG. 7 is a control block diagram of the image processing unit which performs image processing of signals from the CCD photosensor unit.

FIG. 7 is a block diagram showing the control system for forming a latent image on the photosensitive drum 10 through the image processing of light signals from the negative film 2 detected at the CCD photosensor unit 100 by the image processing unit 200 having the aforementioned gamma correction circuit, the masking processing circuit, and the UCR processing circuit.

Based on the image signals of three colors which have been read out at the CCD photosensor unit 100, the image processing unit 200 calculates a proper amount of each of yellow (Y), magenta (M), cyan (C) and black (BK) signals required for the copying (printing), and outputs each color to the laser modulation unit 300. That is, in the case of 4 COLOR mode (Y, M, C, BK), the original is scanned four times, in the case of 3 COLOR mode (Y, M, C), the original is scanned three times, and the original scan of multicolor superimpose printing is performed. The gamma correction circuit 201 is a circuit for correcting the gradation of each color signal, the masking processing circuit 202 is a circuit for calculating a proper amount of the toner of each color (Y, M, C) required for printing, the UCR processing circuit 203 is a circuit for calculating a proper amount of BK toner for the black ink plate forming from the signals of Y, M and C, a dither processing circuit 204 is a circuit for performing binary conversion of intermediate tone image using the dither method, a multi-value encoding processing circuit 205 is a circuit for raising gradation at the intermediate tone by subjecting the image signal binary converted at the dither processing circuit to pulse width modulation. The image processing unit 200 is comprised of the correction processing circuits 201 through 205 and a sync control circuit 206 for sync-controlling these circuits.

The CCD photosensor unit 100 separates the light image from the original to B, G and R, and converts the light thus color separated to an electric signal. The lights of colors B, G and R are photoelectric converted by the CCD 107, 108 and 109. These photoelectric converted B, G and R signals are converted to 8-bit digital signals at a CCD driver B207, a CCD driver G208, and a CCD driver R209, and are further converted to signals of Y, M and C which are complementary colors of B, G and R. These digitized Y, M and C signals VIDEO-Y, VIDEO-M and VIDEO-C are fed to the gamma correction circuit 201 via respective signal lines, and are converted to 6-bit signals for the simplification of data processing after the correction of the gamma curve is performed according to the type of the negative film 2 to be copied. The gamma corrected 6 bit signals VIDEO-Y, VIDEO-M and VIDEO-C are fed to the masking processing circuit 202, and is fed to the UCR processing circuit 203, after a proper color correction for printing is performed. At the UCR processing circuit 203, the amount of under color to be removed is calculated based on the color corrected Y, M and C signals VIDEO-Y, VIDEO-M and VIDEO-C, and the amount of black (BK) is obtained. The amount obtained by subtracting the amount of BK from each color of Y, M and C becomes the amount of color corrected Y, M and C. The above 4 color Y, M, C and BK image (VIDEO) signals are fed to the dither processing circuit 204 in the sequence of Y, M, C and BK in each exposure scan by color. In the dither processing circuit 204, the intermediate tone representation is performed according to the dot density per unit area based on the 6 bit digital signal having been fed, dither processing of three different threshold values is performed, and binary signals are output. The multi-value encoding processing circuit 205 performs 4-value pulse width modulation according to the three binary coded signals fed from the dither processing circuit 204, and outputs the pulse width modulated binary signal to the laser modulation unit 300. The laser modulation unit 300 feeds the abov binary signal to a laser driver 301, emits a laser beam from a laser unit to the polygon mirror 29, and forms a latent image on the photosensitive drum 10.

The main body control 400 performs the aforementioned image processing sequence control and the sequence control of an entire copying machine.

Figure 8:
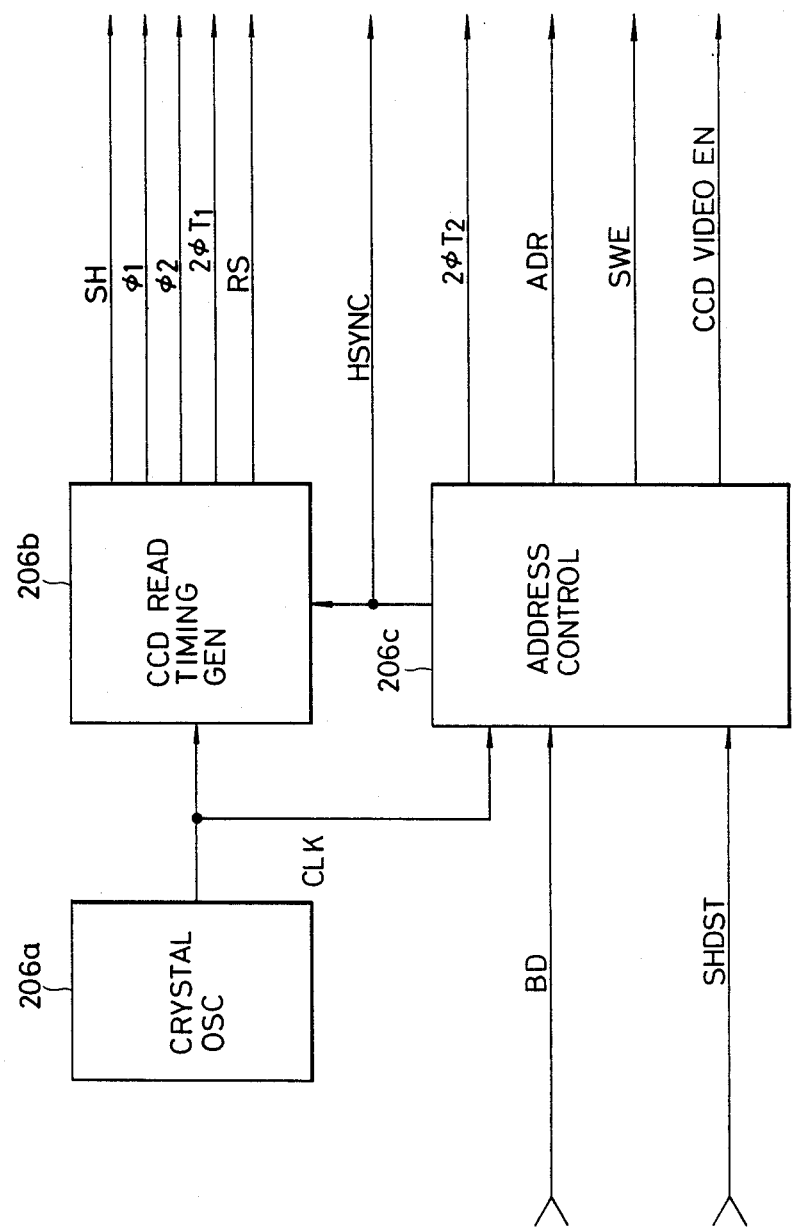
FIG. 8 is a block diagram of the sync control circuit.

FIG. 8 shows a block diagram of the sync control circuit 206 of the image processing unit 200 shown in FIG. 7. The sync control circuit 206 is comprised of a crystal oscillator 206a, a CCD read timing generator 206b, and an address control unit 206c, drives CCD drivers 207 through 209 synchronized with a beam detect signal BD at each time of a single line scan from the laser scanner, counts serial picture element data outputted from the CCD 107 through 109, and performs address control of a single scan line.

From the crystal oscillator 206a, clock CLK of the frequency four times that of image transfer clock $2\phi T$ is output to the CCD read timing generator 206b and the address control unit 206c. The image transfer clock $2\phi T_1$ is a clock for transferring the serial image data to be output from th CCD 107 through 109, and is fed to the CCD driver B207, the CCD driver G208, and the CCD driver R208. An image transfer clock $2\phi T_2$ is fed to each of correction circuit 201 and processing circuits 202 through 205 in the image processing unit 200.

The address control unit 206c outputs a horizontal sync signal HSYNC synchronized with the aforementioned beam detect signal BD, and the CCD read timing generator 206b outputs a shift pulse signal SH for starting read-out of the CCD 107 through 109 to be CCD driver B207, the CCD driver G208, and the CCD driver R209 according to the HSYNC signal. Signals $\phi_1$, $\phi_2$, and RS are signals required for driving the CCD 107 through 109, and are fed to the CCD driver B207, the CCD driver G208, and the CCD driver R209 from the CCD read timing generator 206b. An address signal ADR is a 13-bit signal, counts 4752 bit image signal from the CCD 107 through 109 to be outputted line by line by color, and is fed to a shading correction circuit (not shown).

Figure 9:
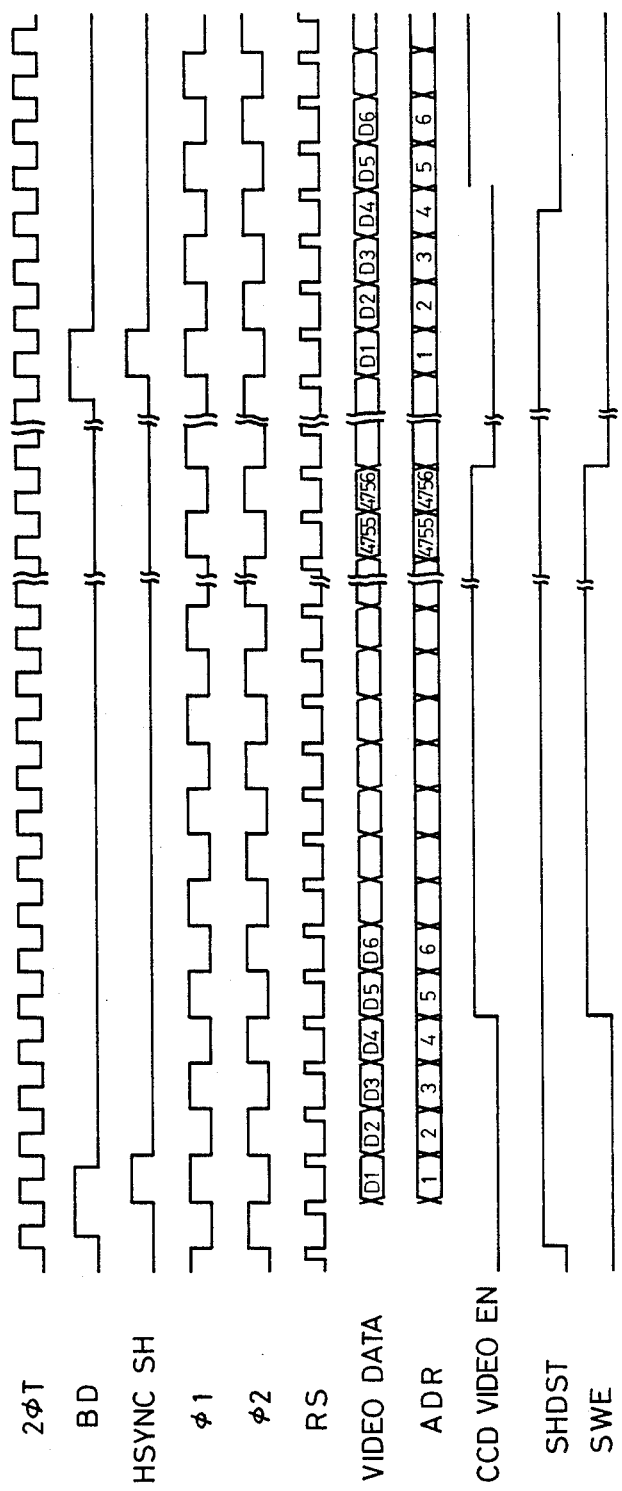
FIG. 9 is a time chart of the sync control circuit.

FIG. 9 is an operation timing chart of the sync control circuit 206. Image transfer clock $2\phi T$ synchronizes the beam detect signal BD for each line issued from the laser scanner, and causes to geneate a shift pulse signal SH for starting read-out of the CCD 107 through 109. Signals $\phi_1$ and $\phi_2$ are signals of the period twice that of the image transfer clock $2\phi T$ and of different phase, and are clock signals for shifting the odd part and the even part registers of the CCD 107 through 109. Signal VIDEO DATA from the CCD 107 through 109 are read out in such a way that the first image data $D_1$ is read out by the shift pulse signal SH, then image data $D_2$, $D_3$, . . . are read out sequentially a many as 5000 bits of which from data $D_5$ to $D_{4756}$, i.e., 4752 bits, are image data for a single line since data $D_1$ to $D_4$ are dummy picture element of the CCD, and signal CCD VIDEO EN becomes the active state in the section from 5th to 4756th bits. Signal RS is a pulse signal for resetting the shift registers of the CCD 107 through 109 at each shift, and is generated at the trailing edge (the end of each bit) of signal VIDEO DATA. A shading start signal SHDST is a signal to be fed from the main body control unit 400.

Now, the gamma correction circuit 201 will be described in detail.

The color negative film 2 is coated with three layers of a solution made by adding coupler generating complementary colors Y, M and C to an emulsion sensitive to three primary colors B, G and R. The sensitivity of an emulsion sensitive to the three primary colors and gamma are not the same, and differ according to the type (maker) of the negative film. In addition, developed negative film is masked in orange color which differs according to the type. Accordingly, the value of gamma should be selected properly.

Figure 10:
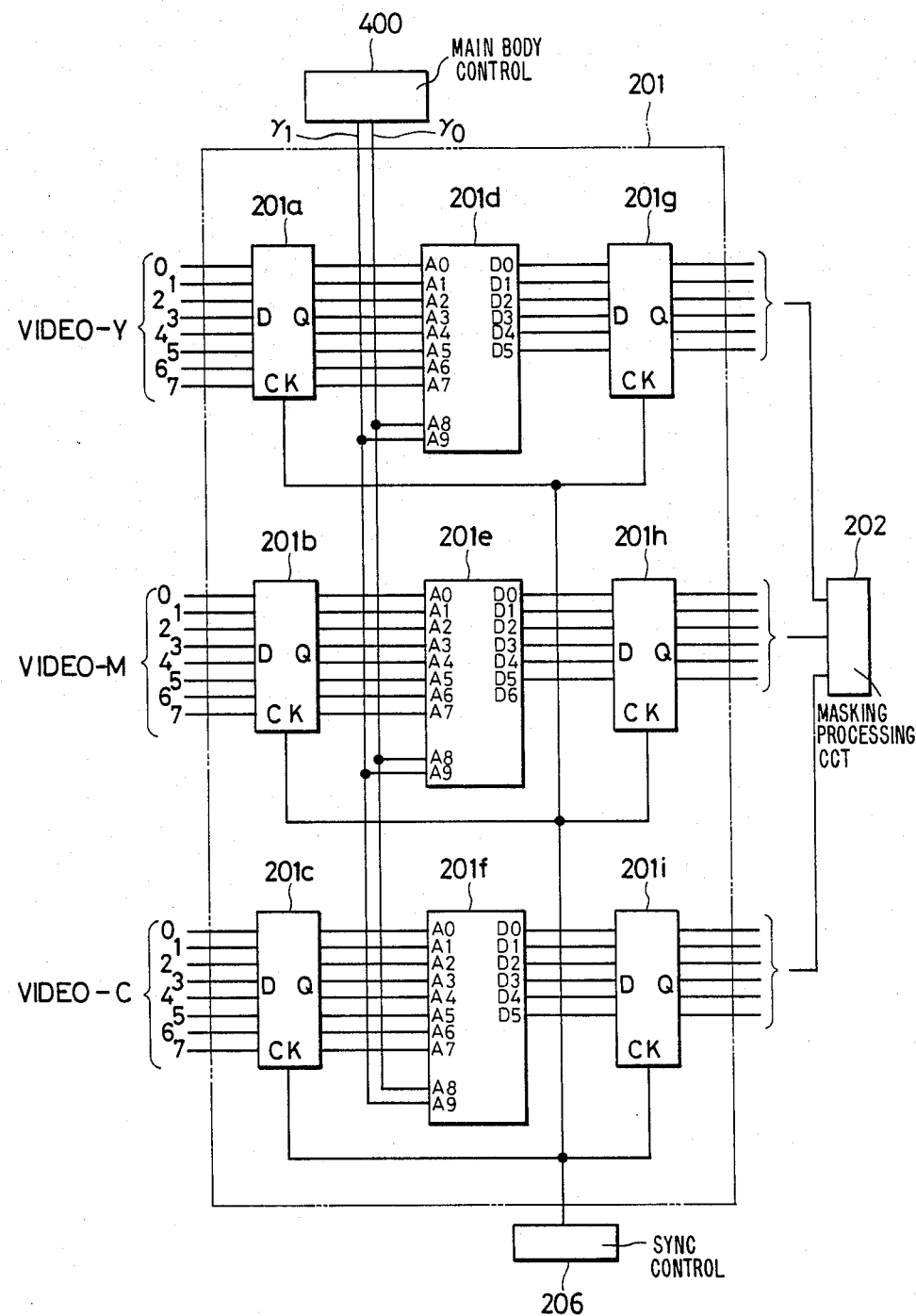
FIG. 10 is a circuit diagram of the gamma correction circuit.

FIG. 10 is a circuit diagram of the gamma correction circuit 201. Picture element signals VIDEO-Y, VIDEO-M and VIDEO-C from the CCD driver B207, the CCD driver G208, and the CCD driver R209 are latched to IC201a, 201b and 201c, respectively, by sync signal from the sync control circuit 006, and are fed to IC201d, 201e and 201f. IC201d through 201f are comprised of ROM or RAM. Output data from IC201d through 201f are latched to IC201g, 201h and 201i by the sync signal from the sync control circuit 206, and are output to the masking processing circuit 202.

For the gamma correction of signals VIDEO-Y0 to 7 from the CCD DRIVER B207, first signals of $\gamma_0=0$ and $\gamma_1=0$ are output from the main body control unit 400 to IC201d to 201f addresses A8 and A9. Then, 00, 01, 02, . . . 3E, 3F are stored at addresses 000, 001, 002, . . . 03E, and 03F of IC201d in advance. Now, the input and output become directly proportional. Alternatively, when 3F, 3E, . . . 01 and 00 are stored in advance at addresses 100, 101, . . . 13E and 13F of IC201d, input and output become inversely proportional. In this manner, gamma can be changed freely by the content stored in IC201d, 201e and 201f. That is, according to the type of the negative film, the optimum gamma curve is found and stored. When any of the pushbutton switches 26a, 26b and 26c of the main operation panel 26 is pressed, the main body control unit 400 selects the address of prestored gamma curve, and a copy optimumly gamma corrected according to the type of the negative film to be copied can be obtained. Accordingly, color image of the same gradation can be reproduced regardless of the type of the negative film.

In this manner, by operating the pushbutton switch 26a, 26b, 26c as a selection mechanism provided in the main operation panel or the color mode selection key 26g - 26m, and by selecting optimum gamma curve according to the type of the negative film to be copied, optimumly color corrected copy can be obtained. In addition, since gamma can be changed also by the dither processing circuit 204, properly color corrected copy can be obtained by a copying machine not provided with the above gamma correction circuit 201. In this case, designing to change the dither pattern according to the type of the negative film is only what is required.

Though the color balance is broken when the light source at the negative film photographing differs, color correction of the light source can also be made by providing a selection pushbutton switch typically of the fluorescent lamp or a tungsten lamp, and by selecting the gamma curve suitable to the light source.

Though the embodiment is of the construction wherein the operator selects the gamma curve according to the type of the negative film, it may be structured so as to provide a notch or the like on the cartridge of the negative film according to the type of the negative film, to detect the type of the negative film by setting this cartridge on the image processor, and to reproduce a color image of the same gradation regardless of the type of the negative film by automatically selecting the gamma curve.

What I claim is:

1. A color image processing apparatus comprising:
   read-out means for reading a color negative film to produce three color component signals, one color component signal for each of three formation colors;
   generation means for generating an indication signal indicating a type or condition of the color negative film read by said read-out means;
   gamma correction means for correcting gamma characteristics of the three color component signals and for removing an orange mask component of the color negative film from the three color component signals in accordance with the indication signal generated by said generation means;
   color masking processing means for deriving a recording color signal for each formation color from the three gamma-corrected color component signals from which the orange mask component has been removed;
   color image forming means for sequentially forming color images of the formation colors from the corresponding color signals; and
   control means for enabling said read-out means, said gamma correction means and said color masking processing means a predetermined number of times corresponding to the number of formation colors.

2. An apparatus according to claim 1, wherein said color image forming means is a transfer type of color printer.

3. An apparatus according to claim 2, wherein said color printer is a type which sequentially forms latent images corresponding to a plurality of formation colors on a photoconductive surface and develops the latent images with respective toners corresponding to the formation colors.

4. An apparatus according to claim 1, wherein said read-out means includes:
   support means for supporting the color negative film; and
   conversion means for converting an image on the color negative film into an electrical signal.

5. An apparatus according to claim 1, wherein said generation means includes:
   manually operable means for setting the type or condition of the color negative film; and
   a generation unit for generating the indication signal in accordance with the setting operation of said manually operable means.

6. An apparatus according to claim 1, wherein said gamma correction means includes a memory storing tables for performing the correcting and removing operations on the color component signals.

7. A color image processing apparatus comprising:
   read-out means for reading a color negative film to produce three color component signals;
   removal means for removing an orange mask component of the color negative film from the three color component signals;
   generation means for generating an indication signal indicating a type or condition of the color negative film read by said read-out means; and
   control means for controlling removal characteristics of said removal means in response to the indication signal generated by said generation means.

8. A color image processing apparatus according to claim 7, wherein said read-out means includes:
   support means for supporting the color negative film; and
   conversion means for converting an image on the color negative film into an electrical signal.

9. A color image processing apparatus according to claim 7, wherein said removal means includes a memory storing tables provided for each of the three color component signals.

10. A color image processing apparatus according to claim 9, wherein the number of tables provided for each of the three color component signals is equal to the number of kinds or conditions of the color negative film for which said generation means can generate an indication signal.

11. A color image processing apparatus according to claim 7, wherein said generation means includes:
    manually operable means for setting the type or condition of the color negative film; and
    a generation unit for generating the indication signal in accordance with the setting operation of said manually operable means.

* * * * *

UNITED STATES PATENT AND TRADEMARK OFFICE
CERTIFICATE OF CORRECTION

PATENT NO. : 4,833,532
DATED : May 23, 1989
INVENTOR(S) : SHUNICHI ABE

It is certified that error appears in the above-identified patent and that said Letters Patent is hereby corrected as shown below:

Column 1
    Line 32, "mdde" should read --made--.

COLUMN 2
    Line 51, "oftthe" should read --of the--.
    Line 52, "negative fimm 2" should read
        --negative film 2--.

Column 3
    Line 15, "prvvided" should read --provided--.
    Line 28, "bod" should read --body--.

Column 4
    Line 20, "and" should be deleted.

Column 5
    Line 8, "cppy" should read --copy--.
    Line 65, "ooupled" should read --coupled--.

COLUMN 6
    Line 11, "it" (first occurrence) should read --is--.
    Line 33, "mage" should read --image--.

COLUMN 7
    Line 5, "CCDS 107, 108" should read --CCDs 107, 108--.
    Line 25, "seaaration nail 46" should read
        --separation nail 46--.
    Line 31, "th" should read --the--.
    Line 34, "oor" should read --for--.
    Line 54, "$M_0 = a_2 Yi + b_2 Mi - c_2 Ci(b)$" should read
        --$M_0 = -a_2 Yi + b_2 Mi - c_2 Ci$     (b)--.

UNITED STATES PATENT AND TRADEMARK OFFICE
CERTIFICATE OF CORRECTION

PATENT NO. : 4,833,532

DATED : May 23, 1989

INVENTOR(S) : SHUNICHI ABE

It is certified that error appears in the above-identified patent and that said Letters Patent is hereby corrected as shown below:

COLUMN 9

Line 5, "abov" should read --above--.
Line 26, "th" should read --the--.
Line 49, "geneate" should read --generate--.
Line 58, "a" should read --as--.

COLUMN 10

Line 18, "sync control circuit 006," should read --sync control circuit 206,--.
Line 52, "proccssing" should read --processing--.

Signed and Sealed this

Twenty-third Day of January, 1990

Attest:

JEFFREY M. SAMUELS

*Attesting Officer*   *Acting Commissioner of Patents and Trademarks*